Figure 1:
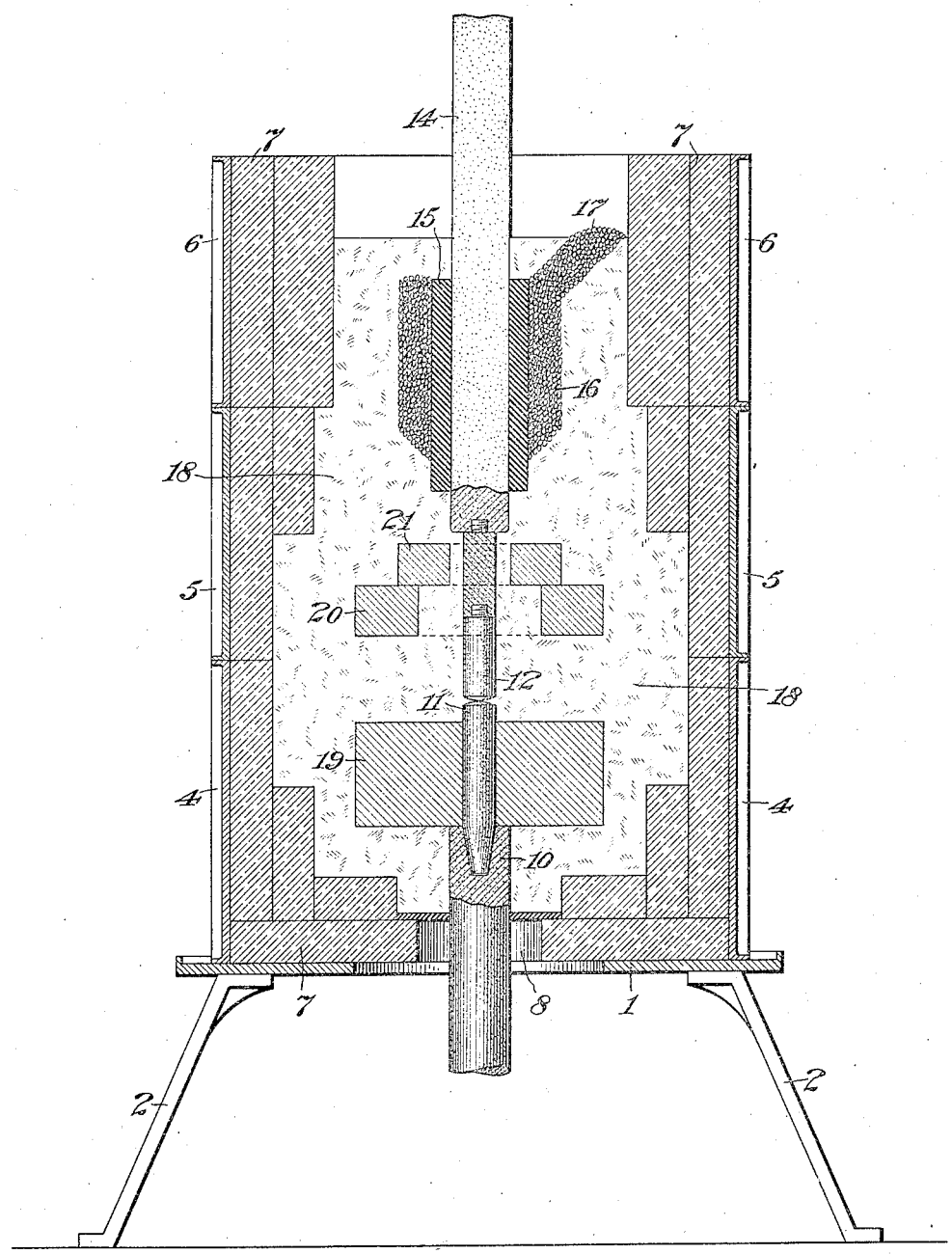

H. N. POTTER.
METHOD OF PRODUCING SILICON.
APPLICATION FILED MAY 22, 1905.

908,130.

Patented Dec. 29, 1908.

2 SHEETS—SHEET 1.

WITNESSES:
Chas. F. Clagett
W. H. Capel

INVENTOR
Harry N. Potter
BY his ATTORNEY
Charles A. Terry

H. N. POTTER.
METHOD OF PRODUCING SILICON.
APPLICATION FILED MAY 22, 1905.

908,130.

Patented Dec. 29, 1908.

2 SHEETS—SHEET 2.

WITNESSES:
Chas. F. Clagett
Wm. H. Capel

INVENTOR
Henry Noel Potter
BY his ATTORNEY
Charles A. Terry

UNITED STATES PATENT OFFICE.

HENRY NOEL POTTER, OF NEW ROCHELLE, NEW YORK, ASSIGNOR TO GEO. WESTINGHOUSE, OF PITTSBURG, PENNSYLVANIA.

METHOD OF PRODUCING SILICON.

No. 908,130.      Specification of Letters Patent.      Patented Dec. 29, 1908.

Application filed May 22, 1905. Serial No. 261,531.

*To all whom it may concern:*

Be it known that I, HENRY NOEL POTTER, a citizen of the United States, and resident of New Rochelle, county of Westchester, State of New York, have invented certain new and useful Improvements in Methods of Producing Silicon, of which the following is a specification.

I have invented a new and improved process of making silicon free from silicon carbid.

It is known that silicon can be produced by reducing silicon dioxid by means of carbon in the free state or combined with silicon in the form of silicon carbid.

The reactions have been expressed as follows:

$$SiO_2 + 2C = Si + 2CO \quad (A)$$

and $$SiO_2 + 2SiC = 3Si + 2CO \quad (B)$$

It has also been proposed to employ reaction A and keep the temperature below that necessary for the formation of SiC by the union of silicon and carbon, or the reduction of silicon dioxid in the presence of excess carbon. Such a process is defective because silicon carbid is produced at such low temperature as to preclude any commercially efficient yield of silicon, if indeed any at all, at temperatures still lower. There is no evidence to show that amorphous silicon carbid requires any higher temperature for its formation than silicon itself. The reaction does not take place as stated in A, but in a manner expressible as follows:

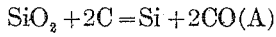
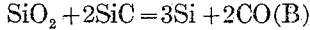

(A') $(a)SiO_2 + (2a)C =$
$(r) SiC + (s) Si + (t) SiO + (2a - r)CO$, neglecting the hypothetical $(SiC)_xO_y$ or "siloxicon" compounds.

The above expression may be considered to be the simultaneous occurrence of three reactions:

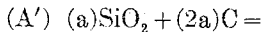
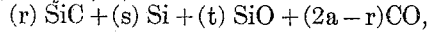

$$(A') = \begin{cases} 1. \ (r) \ SiO_2 + (3r) \ C = (r) \ SiC + (2r) \ CO \\ 2. \ (s) \ SiO_2 + (2s) \ C = (s) \ Si + (2s) \ CO \\ 3. \ (t) \ SiO_2 + (t) \ C + (t) \ SiO + (t) \ CO \end{cases}$$

where

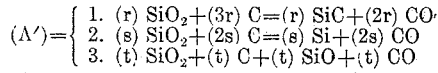

$\left. \begin{array}{l} r + s + t = a \\ 3r + 2s + t = 2a \end{array} \right\} 2r + s = a \text{ and } r = t$ of the original (A') expression.

As a mixture of granular coke and sand, for example, is made up of masses of enormous size relative to individual molecules, the mixture is not homogeneous like a solution of one liquid in another, or a mixture of gases, but is a mass in which at some spots carbon is in excess, at others silica, so that it is quite possible that the three reactions may go on simultaneously as outlined. There are four principal reaction products, SiC, Si, SiO and CO, which separate according to their properties. Si dissolves some or all the SiC and the two flow down till they either freeze or find lodgment before solidifying. The SiO and CO pass off together, the SiO depositing in the gas vents through which CO escapes.

The dominant relation is that there are the same number of atoms of C as of O. If this balance be disturbed in any way, for example, by volatilizing away some $SiO_2$ unreduced, or by changing the mixture proportions in the beginning, the relative values of r, s and t will be changed, but experience shows that "r" cannot be made zero in any mixture yielding a sufficient quantity of silicon per kilowatt hour to be commercially efficient. The reason appears to be that fluid Si adheres firmly to SiC and dissolves at least a portion of it.

The fluid silicon shields the contained SiC from rapid reaction with $SiO_2$ which can react easily with the free carbon present. Increasing the $SiO_2$ in the mixture does not prevent this, and does increase the value of "t", representing energy diverted from silicon production and consequently a reduced yield of silicon.

The existence of the compound SiO was discovered by the applicant and described in his application #238,925, filed December 30, 1904. Applicant is thus the first to appreciate the presence and importance of SiO accompanying the production of silicon by reduction of $SiO_2$.

There is a second reaction expression (B) wherein SiC is introduced into the reaction mixture initially and not wholly produced there as in expression (A'). This expression "B" contains no free carbon and therefore is not the basis of a cheap mixture. However, there is a cheap by-product of the manufacture of crystalline SiC, or carborundum, which contains a large amount of SiC, mostly in the amorphous state, also some free carbon and $SiO_2$. This crude material is called "carborundum fire sand" and varies somewhat in composition, a sample analysis showing:

SiC ........................ 70.05%
SiO$_2$ ...................... 17.21%
C .......................... 6.65%
Slag ....................... 6.09%

It has been claimed that this material contains oxy-carbid compounds of the general composition (SiC)$_x$O$_{yj}$, also written Si$_x$C$_x$O$_y$, and called "siloxicon". However, as these compounds, if existent, are split by analytical reagents such as caustic alkalies and hydrofluoric acid, they do not appear in the applicant's analysis and their existence or non-existence is not important in the consideration of the reactions here expressed. It is clear that with this "firesand" together with silica and extra coke if desired, a mixture can be made having the composition, (C)   (l)SiC + (m)SiO$_2$ + (n)C and under the conditions to be described, I find that the largest yield of silicon is given by proportioning the mixture about as follows:

(C')   8SiO$_2$ + 6SiC + 4C which may also be expressed (C')   $\begin{cases} 3SiO_2 + 6SiC + (B) \\ 2SiO_2 + 4C + (A) \\ 3SiO_2 \end{cases}$ showing it to be a combination of the expressions (A) and (B) with excess SiO$_2$.

It must not be assumed that the mixture stated yields Si free from SiC, as there is no evidence that it does, in fact it probably yields an Si rich in SiC. What it does do is to yield a large amount of Si per kilowatt hour, which by a second step in the process is freed from any contained SiC.

Before describing the purification process, I may say that it is applicable to Si produced from a mixture like expression (A) or like (B) or like (C'), the advantage of the latter being the larger yield per dollar expended on mixture power relative to (A) and (B) at present prices.

Mixture formula (C') is by weight

SiO$_2$ ........................ 62.4%
SiC ......................... 31.4%
C ........................... 6.2% an analysis of an actual mixture showed

SiO$_2$ ........................ 59.72%
SiC ......................... 31.51%
C ........................... 6.00%
Slag ........................ 2.76%

This latter mixture run in an electric arc furnace using alternating current, 32 K. W. on primary during 40 K. W. hours, measured at the arc, yielded over 2000 grams of available silicon, a rate of over 50 grams per K. W. hour.

It is possible to vary the relative proportions of SiC and C and to use slightly more or less excess SiO$_2$, but the best mixture proportion is readily determined for any set of furnace conditions.

I will now describe my process of purification.

I have discovered that fluid silicon does not dissolve carbon, but does dissolve silicon carbid. I have further found that SiC and SiO$_2$ react readily beneath a bath of fluid silicon, the products being either Si, or SiO, or both and CO. SiC can also react with SiO, the products being Si and CO. It is thus clear that if SiO$_2$ be present beneath a bath of fluid Si, that there the SiO$_2$ and contained SiC can react, while any SiO liberated may react with SiC, so that the final products are Si, which adds itself to the silicon already present, and CO, which escapes.

Even though particles of carbon should be carried down into the bath mechanically, they can do no injury as, even assuming them to react with the bed and produce some SiC, this would then be immediately removed by reaction with the bed. Under conditions of practice as described it is inconceivable that any quantity of carbon too great for the bed to take care of can ever be introduced. My own belief is that no carbon whatever is brought down, and I further believe that the density of melted silicon is such that carbon will float thereon, so that even if willfully introduced, it could not come in contact with the bed, except at the edges where it would constitute practically a part of the mixture.

The temperature is sufficient to cause a bed of granular quartz sand to fuse into a vitreous mass of sufficient sustaining power to support the fused silicon in a hollow formed in the silica bed.

A very satisfactory arrangement is to use an electric arc furnace having vertical coaxial electrodes, the lower surrounded near the arc by a bed of silica upon which surrounding the arc and upper electrode is a mixture like (C').

The mixture upon the bed must be deep enough to prevent the furnace blowing which occurs when the escaping CO gas opens a large vent through which it escapes, carrying SiO, SiO$_2$, and Si as dust or vapors with it, which is undesirable.

If the CO escapes through a porous mass of crushed carbon for example, it is cooled enough to issue alone.

It is an advantage to have both electrodes movable, and it is also an advantage to operate a long arc at about 150 volts or higher, rather than at 100 volts, as can be done.

A difficulty of operation is the freezing of a mass of mixture and SiO about the upper electrode, hindering or entirely preventing any movement for changing the length of the arc during operation, and so difficult to remove after a run that many electrodes have been broken. I find that this is satisfactorily overcome by incasing the upper electrode throughout the region where SiO lodges with slabs of carbon or granular carbon, or best of all, with slabs surrounded by granular carbon. The SiO deposits upon the slabs or granules and the electrode remains free and after the run can be easily removed by cracking open the casing. The slabs are easily recovered and can be used again.

A further advantage is to use a second silica bed built in annular form around the upper electrode, the size and distance of this bed above the bottom bed depends upon the size of furnace and duration of run.

In operation there is a hollow formed about the arc and this hollow extends upward in pear shape and toward the end of the run reaches the upper silica bed which then drips plastic silica upon the lower bed and the silicon bath. The function of this upper bed seems to be to form a narrower throat for the upwardly growing hollow and thus contract the region of reaction and in a measure compel the hollow to grow broad rather than tall, which is the tendency when uncontrolled. At any rate, the yield is improved per kilowatt hour by the upper bed, other things being equal. I have also tried entirely surrounding a mixture with an envelop of silica, but this is a disadvantage, as the yield is reduced. This, I ascribe to the silica vitrifying into a dense mass which conducts heat much better than the reactive mixture, either when the latter is loose or fitted together into a porous, slightly coherent mass.

I have tried a great number of arrangements of mixture zones, layers, sectors, rings, etc., combined with other zones, layers, sectors, etc. of silica. Some of these arrangements are satisfactory as to yield, and all are instructive in showing what probably occurs during reaction, but the arrangement described combines several desirable features and is easily and cheaply constructed.

While I have specified many details of a particular method of operating my invention, I do not wish to appear to state that there is but one such method, and I will therefore describe a second method of operation.

In my former method, I have used as a source of heat an arc between carbon electrodes. I have also tried furnaces of the resistance type having carbon resisters of both continuous and granular type, but have found them unsatisfactory, as the resisters are rapidly destroyed, apparently by the vapor of silica, or silicon.

Another type of resistance furnace is to use the fluid silicon bath as a resistance and pass a current through it in any satisfactory manner, as for example, by giving it an extended shape between carbon electrodes, preferably entirely immersed in the fluid silicon bath or in solid silicon extensions of the same, produced by keeping the temperature of these extensions below the melting point of silicon. Once formed, such a resistance bath can be kept at any suitable temperature and reactive mixture added to it, tapping off the silicon produced, from time to time. Such a process may with advantage operate upon mixture of somewhat different proportions from that in the arc process, as there is no carbon introduced by electrode wear, etc. The distinctive feature of reacting upon SiC by $SiO_2$ under fluid Si is however, characteristic of this process, as of the other.

Figure 2:
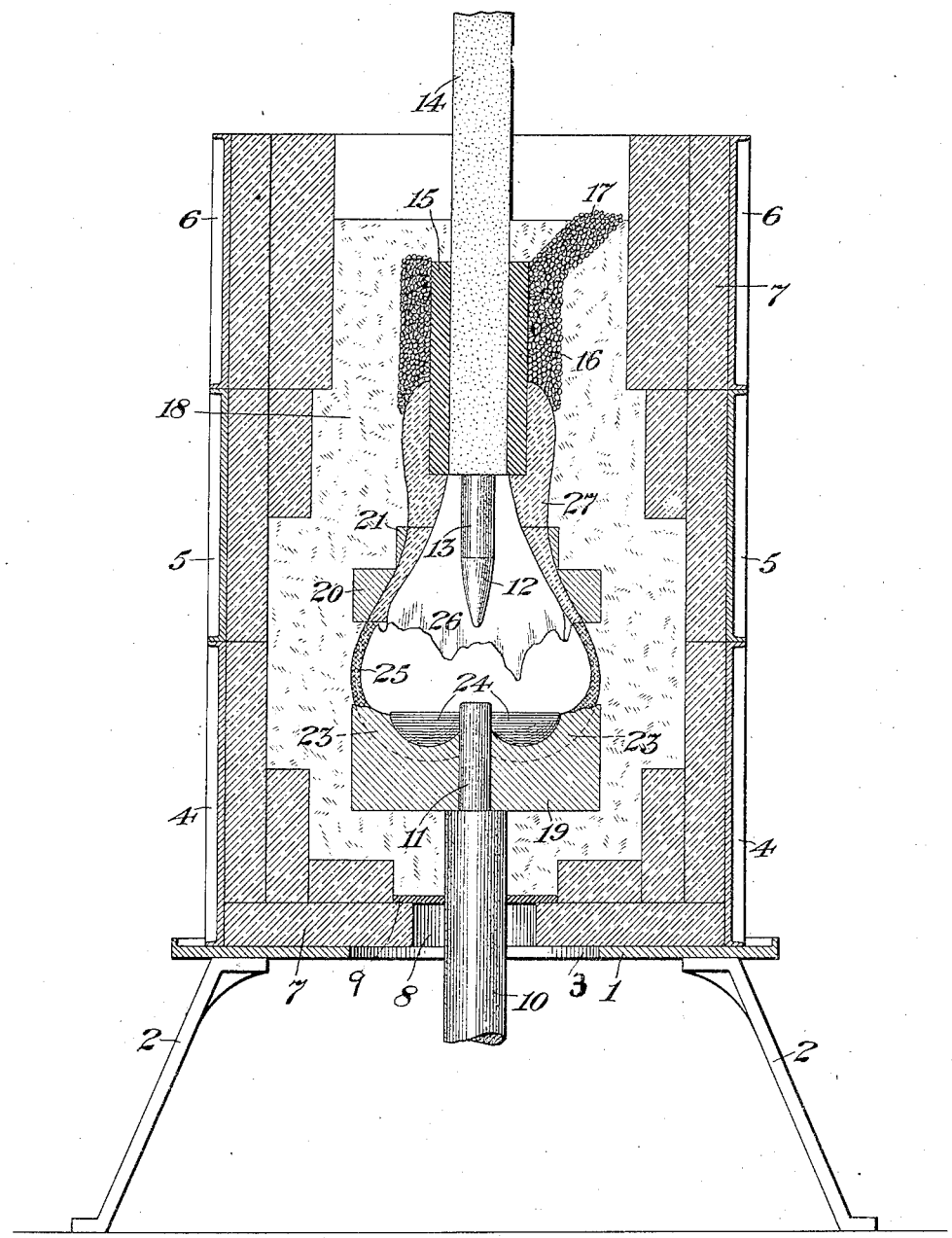

Referring now to the drawings, Figure 1 shows a vertical section through the center of an arc furnace arranged substantially as described; and Fig. 2 is a vertical section of a furnace after a complete run showing the effect of the run and the location of the silicon and silicon monoxid. The furnace consists of a cast iron bottom plate 1, 1, supported on legs 2, 2, and having a hole 3, in its center. On this bottom plate are sectional frames 4, 4, 5, 5, and 6, 6. These sectional frames and the bottom plate are lined with fire brick 7, 7, 7, the brick on the bottom being provided with a hole 8, covered with an asbestos plate 9, through which projects the lower terminal 10, which is made of graphite. Into the terminal 10, fits the electrode proper 11. The upper electrode is composed of the round portions 12 and 13 and the square portion 14 of larger size. Around the square portion 14 are arranged carbon slabs 15, 15, which in turn are surrounded by granular carbon 16, 16. This granular carbon toward the top is provided with a continuation 17. The furnace about the electrodes and within the framework is filled with reactive mixture 18 18, and the various beds of silica 19, 20 and 21. Bed 19 is the lower bed on which the silicon produced collects and is purified as described. 20 is the annular bed, also described; 21 is a continuation of 20, having a smaller central hole. The two together constitute practically a conical, hollow upper bed.

In operation about 150 volts is applied to the arc and the upper electrode lifted, the arc becoming eventually between 4" and 5" in length. The upper portion of the electrode 11 and the lower portion of the electrode 12 burn away. The portions 10 and 14 are not injured, the portion 13 being but slightly injured on its surface. After the run is over, the piece 13, with whatever is left of 12, is unscrewed from 14, and a fresh piece inserted between 14 and 13. In this way, the portions of the electrode injured are replaced at the smallest expense. The same principle of renewal can be applied to the lower electrode, but is not shown. The wear on the upper electrode considerably exceeds that on the lower.

Referring to Fig. 2, it will be observed that around the arc is a hollow, that the lower sand bed 19 has become vitrified above the dotted line 23, while upon the vitrified silica rests the silicon 24 24. The hollow is surrounded by a porous, slightly cohering wall 25 25, where the wall was formed from the mixture 18. Above this in the neighborhood of the sand beds 20 21, the surface is of vitrified silica 26 which has dripped downward as indicated. Still further up is the mass 27 composed of the mixture derived from 18, crushed carbon from 16, and silicon monoxid which has found lodgment in vents formed by the carbon monoxid gas. After the run, the furnace is taken down, being so designed that this is accomplished with very little labor, and the pear shaped envelop removed, cracked open and the silicon obtained.

The wall mixture —25— and the SiO material —27— are separated and saved for making powdered SiO in a special furnace. The vitrified silica —23— etc. is saved for uses to which it is adapted, while the mixture —18— can be run again. The granular carbon —16— is composed entirely of lumps which can be separated out by sifting the mixture —18— which passes through the sieve leaving the granular carbon thereon.

Claims

1. The process of eliminating silicon carbid from silicon, consisting in reacting upon the said carbid by means of silicon dioxid under fluid silicon.

2. The process of producing silicon free from silicon carbid, which consists in maintaining the silicon in a fluid state in contact with silicon dioxid, until all contained carbid is destroyed.

3. A process of purifying silicon from SiC, consisting in maintaining it in a fluid state upon a bed of silica.

4. The method of producing silicon by the reduction of silica in the presence of silicon carbid, the collection of fluid silicon and any contained silicon carbid upon a silica bed and the oxidation of the carbon of the contained silicon carbid by reaction with the said bed.

5. The method of producing silicon in an electric furnace by first producing a crude silicon containing silicon carbid and by a second reaction in the same furnace, oxidizing the carbon of the contained carbid under fluid silicon.

6. The process of producing silicon which consists in first reducing the silica of a silica carbon mixture and then removing the silicon carbid produced by the above reduction, by causing it to reduce silica in a bed thereof under molten silicon.

7. The production in an electric furnace of a fluid aggregate of silicon and silicon carbid, in such a manner as to allow the same to flow down and collect upon a bed of silica, and there causing reaction between the silicon carbid and the said bed, whereby the said carbid is broken up.

8. A method of producing silicon which consists in promoting a reaction between comminuted silica and silicon carbid, collecting the crude fluid silicon produced upon a bed of silica, and promoting reaction between any silicon carbid contained in said fluid silicon and the said silica bed until the silicon shall be freed from all contained carbon.

9. The method of producing silicon which consists in promoting a reaction between silicon carbid and silica beneath fluid silicon in an electric furnace which supplies heat for promoting the said reaction and also for producing crude fluid silicon containing silicon carbid, by a reaction between comminuted silica and carboniferous material.

10. An electric furnace process, yielding silicon and silicon monoxid, which consists in promoting reaction between silica and carboniferous material, in about the proportion of 8 molecular equivalents of silica to 10 atomic equivalents of carbon.

11. An electric furnace process, yielding silicon and silicon monoxid, which consists in promoting reaction between silica and carboniferous material in about the proportion of eight molecular equivalents of silica to ten atomic equivalents of carbon, maintaining the collecting silicon in a fluid state upon a bed of silica, and collecting the silicon monoxid in the passages traversed by the escaping gaseous reaction products.

12. The method of producing silicon which consists in reducing silica beneath fluid silicon.

13. The method of producing silicon which consists in electrically fusing a bath of silicon and promoting the reduction of silica therein.

14. The method of producing silicon, which consists in melting a resister of silicon by means of electric current and effecting therein a reduction of silica.

Signed at New York, in the county of New York and State of New York this 15th day of May, A. D. 1905.

HENRY NOEL POTTER.

Witnesses:
WM. H. CAPEL,
GEORGE H. STOCKBRIDGE.